(12) United States Patent
Squillante et al.

(10) Patent No.: US 9,224,901 B1
(45) Date of Patent: Dec. 29, 2015

(54) SCINTILLATOR AND SEMICONDUCTOR BASED MATERIALS INCORPORATING RADIOACTIVE MATERIALS

(71) Applicant: Radiation Monitoring Devices, Inc., Watertown, MA (US)

(72) Inventors: Michael Squillante, Waltham, MA (US); William M. Higgins, Westborough, MA (US); Vivek Nagarkar, Weston, MA (US); Noa M. Rensing, West Newton, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 119 days.

(21) Appl. No.: 13/657,424

(22) Filed: Oct. 22, 2012

Related U.S. Application Data

(60) Provisional application No. 61/549,354, filed on Oct. 20, 2011.

(51) Int. Cl.
| | | |
|---|---|---|
| *G01T 1/20* | (2006.01) | |
| *H01L 31/115* | (2006.01) | |
| *G01T 1/202* | (2006.01) | |

(52) U.S. Cl.
CPC ............. *H01L 31/115* (2013.01); *G01T 1/20* (2013.01); *G01T 1/2023* (2013.01)

(58) Field of Classification Search
CPC ......... G01T 1/20; G01T 1/202; G01T 1/2023; G01T 1/203; G01T 1/2033
See application file for complete search history.

(56) References Cited

U.S. PATENT DOCUMENTS

2006/0102845 A1* 5/2006 Williams et al. ......... 250/363.03

* cited by examiner

*Primary Examiner* — Mark R Gaworecki
(74) *Attorney, Agent, or Firm* — Wolf, Greenfield & Sacks, P.C.

(57) ABSTRACT

Scintillator and semiconductor based materials incorporating radioactive materials and their method of manufacture are disclosed. The disclosed materials are integrated with energy conversion devices and structures to provide nuclear battery assemblies which exhibit increased power densities.

12 Claims, 3 Drawing Sheets

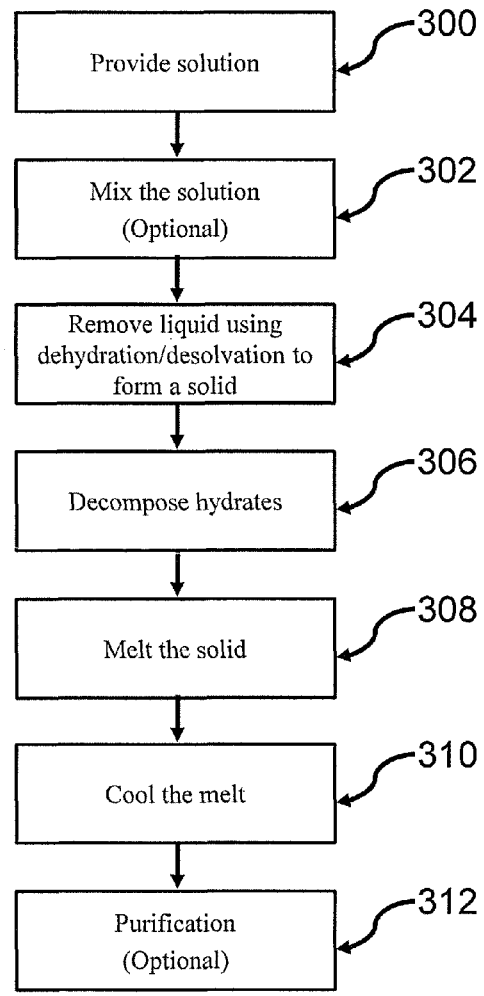
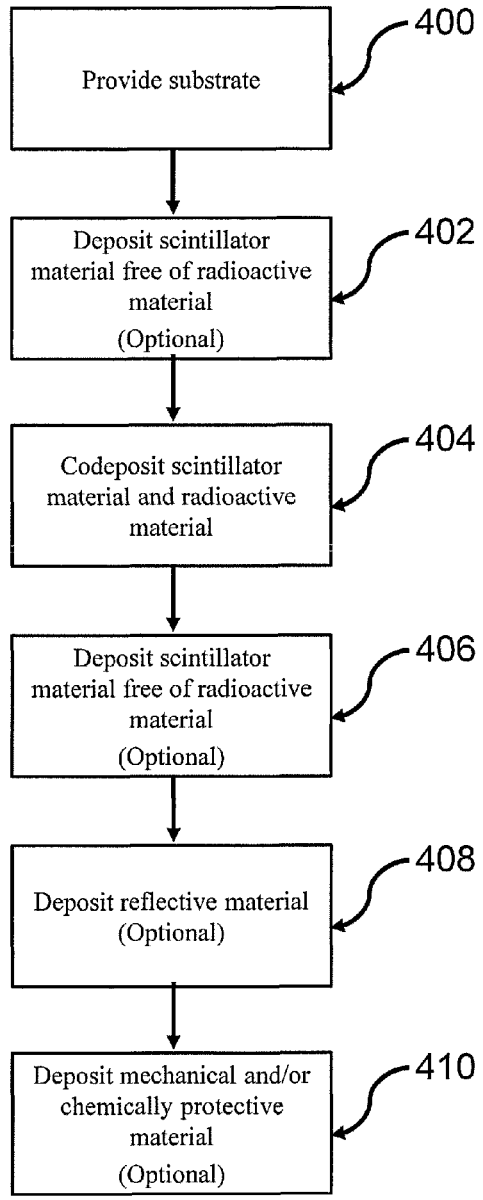
Fig. 4
Fig. 5

SCINTILLATOR AND SEMICONDUCTOR BASED MATERIALS INCORPORATING RADIOACTIVE MATERIALS

CROSS-REFERENCE TO RELATED APPLICATIONS

This application claims the benefit of U.S. provisional application Ser. No. 61/549,354 filed on Oct. 20, 2011, which is incorporated herein by reference in its entirety.

FIELD OF THE INVENTION

Disclosed embodiments are related to scintillator and semiconductor based materials incorporating radioactive materials.

BACKGROUND

Power sources that tap into the energy released in radioactive decay offer the potential for long-lived lightweight power sources that are independent of environmental energy sources such as solar or wind power, and that do not require refueling or recharging. However, such radiation manifests in the form of high energy neutral or charged particles (photons, neutrons, electrons, positrons, or alpha particles), gamma rays, and X-rays which are not suitable for directly powering sensors, electrical circuits, or other manmade devices. What is needed is an efficient, reliable, compact and lightweight technology for converting the energy contained in the radioactive emissions into usable electrical power. Many methods have been attempted, but so far all have significant shortcomings.

At the megawatt and larger scale, which extends for example from nuclear powered submarines through commercial nuclear power plants, thermo-mechanical conversion is the preferred approach. However, this technology does not scale well to small portable (<100 kg) generators. Furthermore, the complex mechanical components require regular maintenance, making the concept unsuitable for extended unattended operation.

For those applications that require independent operation but only moderate to low amounts of power, a solid state device is preferred. Several approaches have been utilized in the past. The most successful to date has been the implementation of radiothermal generators, which use self-absorption in a block of radioactive material to generate heat. The thermal energy is then converted using thermovoltaic devices (e.g. thermocouples and thermoelectric generators). This technology is highly reliable and has been employed, for example, in space probes and in remote monitoring stations in the former USSR. However, the energy conversion is not very efficient, with maximum efficiency values of less than 10% and typical values of only a few percent. Furthermore, this technology can be scaled up, but does not scale down well to very small power applications because of increased heat loss as the ratio of surface area to volume increases.

A competing technology is the conversion of the radiation energy to electricity in a semiconductor junction, analogous to a solar cell. This can be done directly, by absorbing radiation in a semiconductor junction, or indirectly, by first converting the radiation to lower energy photons, namely ultraviolet or visible light. In principle, this can be done for any radioactive emission. However, beta emitters are typically preferred because of the short stopping distance for electrons compared with photons and the lower radiation damage potential compared with neutrons and alpha particles. This is particularly true for very small devices which may not be large enough to completely stop gamma rays. A solid state device that converts radiation to electrical power is called a nuclear battery. In the case of a device which utilizes pure beta radiation, the device would be called a beta-battery.

Several configurations have been demonstrated since beta batteries were first proposed in the 1950's. The most extensively used approach has been the direct approach of placing metal foils of beta particle emitters (such as nickel-63 and promethium-147) adjacent to the surface of a semiconductor diode so that the beta particles strike it, or exposing a semiconductor junction to a gas or liquid containing an emitter such as tritium. In a process analogous to a solar cell, the high energy beta particles generate a large number of electron hole pairs, which in turn generates a current through the diode.

SUMMARY

In one embodiment, a material includes a scintillator material. A radioactive material is incorporated within the scintillator material. The radiation emitted from the radioactive isotope is converted into light emitted by the scintillator material. It should be appreciated that the foregoing concepts, and additional concepts discussed below, may be arranged in any suitable combination, as the present disclosure is not limited in this respect.

In another embodiment, a device includes a first scintillator material. The first scintillator material includes a radioactive material. The radiation emitted from the radioactive material is converted into light emitted by the first scintillator material. An energy conversion device is coupled to the first scintillator material. The energy conversion device converts the light to electrical power.

In yet another embodiment, a device includes a semiconductor diode. A first semiconductor material includes a radioactive material. The first semiconductor material forms at least a portion of the semiconductor diode. The semiconductor diode converts radiation emitted from the radioactive material to electrical power.

A method for fabricating a scintillator includes: providing a solution including both a dissolved scintillator material composition and a dissolved radioactive material; performing at least one of dehydration and desolvation on the solution to form a material comprising both the scintillator material composition and the radioactive material; heating the material to a temperature above a melting point of the scintillator material composition and a melting point of the radioactive material; and cooling the material to form a solid scintillator material including the radioactive material.

A method for fabricating a scintillator includes: vapor phase depositing a first layer onto a substrate, wherein the first layer comprises a scintillator material including a radioactive material incorporated within the scintillator material.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a representative flow diagram for the liquid based production of a scintillator incorporating a radioactive isotope; and FIG. 5 is a representative flow diagram for the physical vapor deposition of a scintillator incorporating a radioactive isotope.

DETAILED DESCRIPTION

Figure 1:
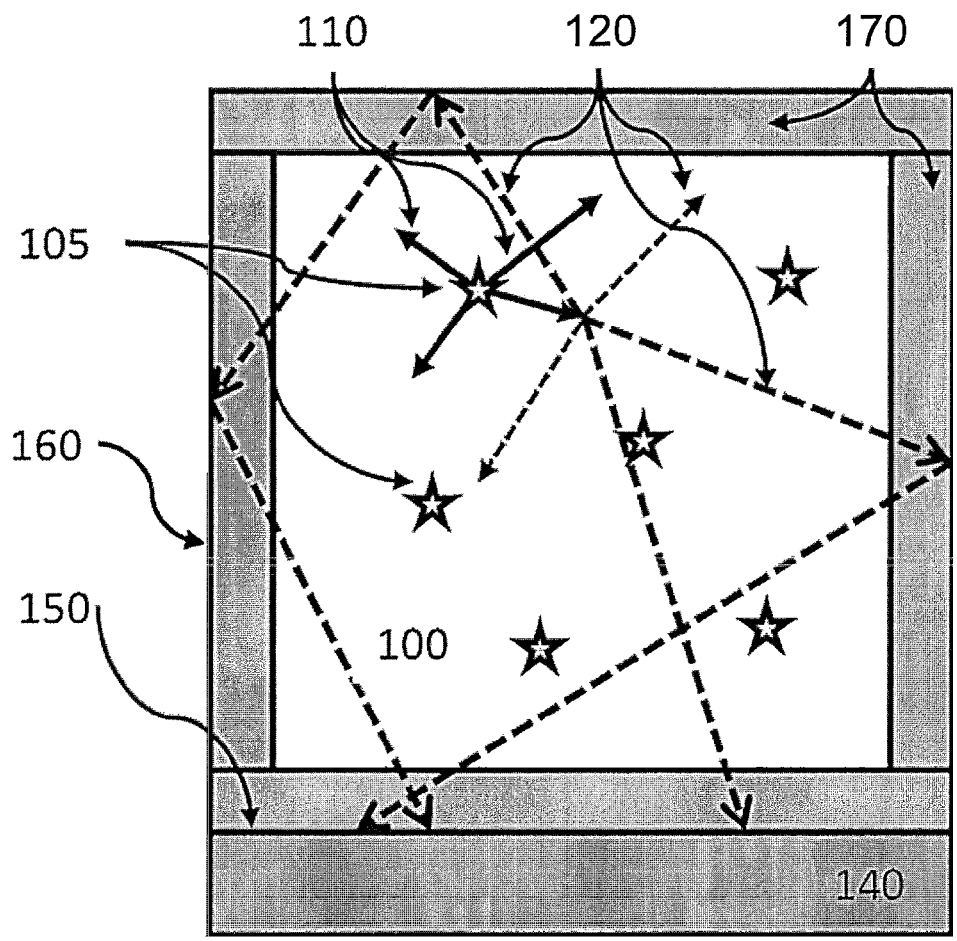
FIG. 1 is a schematic representation of a scintillator incorporating a radioactive isotope coupled to an energy conversion device.

The inventors have recognized that direct conversion of beta particles in a pn semiconductor junction can be problematic for two reasons. First, the sensitive semiconductor junction can be damaged by exposure to high energy radiation. Second, the constraints of the geometry of a semiconductor junction can limit the achievable power density and the scalability of the device. Further, the absorption length of the beta particles may not match the optimum depth of the junction for efficient charge collection, and the junction would typically be close enough to the surface that scattered particles and or secondary radiation (fluorescence, Brehmsstrahlung, or other) may escape through the surface and be lost to the system. The geometry of a device may also limit the amount of radioactive material that can be included to a thin two dimensional layer. For thicker layers, absorption within the radioactive layer itself can limit the efficiency of the conversion. The inventors have also recognized that due to concerns with radiation damage, beta battery efforts to date have been limited to lower energy isotopes such as tritium, nickel-63, and promethium-147. The low energy beta emissions of these materials are less likely to damage the junction, but also mean that the total energy density of the device is low. Consequently, the inventors have recognized that it would be desirable to develop batteries which can take advantage of higher energy emitters such as strontium-90.

One way in which to protect the semiconductor junction from damage due to exposure to the radiation energy, is to provide indirect conversion of the radiation energy. For example, the radiation energy can be converted into lower energy light photons using a phosphor and then converted into electrical energy in a photodetector, such as a photodiode. This arrangement shields the semiconductor junction from direct exposure to the high energy radiation. However, the inventors have recognized that the phosphor cannot be made very thick as it is not typically completely transparent to its own emissions. Therefore, the incident radiation may not be completely stopped in the phosphor, and the total amount of radioactive material that can be incorporated into a given device is also limited.

In view of the above, the inventors have recognized that it would be desirable to provide a nuclear battery with a high energy density. This includes embodiments in which the nuclear battery incorporates indirect conversion of the radiation energy as well as semiconductor device arrangements for direct conversion of the radiation energy.

In one embodiment, a high output scintillator is used instead of a phosphor to convert the radiation energy into light. The scintillator is coupled to an energy conversion device such as a solar cell or other appropriate energy conversion device to further convert the emitted light into usable electrical energy. In some instances, a radioactive material such as a radioactive isotope is incorporated within the scintillator material itself as a constituent element, a dopant, and/or an impurity. In such an embodiment, radiation is both emitted and transformed into light within the scintillator material. As described in more detail below, the scintillator materials incorporating radioactive isotopes can be formed in any number of ways including, but not limited to, liquid based techniques as well as physical vapor deposition techniques. Depending on the particular formation process and post processing techniques used, the scintillator material may be formed as a single crystal, a polycrystalline solid, an amorphous solid, a film, or a ceramic. Without wishing to be bound by theory, when the radioactive material is incorporated into and surrounded by the scintillator material, substantially all of the emitted radiation can be converted into lower energy photons for subsequent conversion into electrical energy by an associated energy conversion device. This is in contrast to a foil or other coating which emits half the radiation in the direction opposite to the pn junction resulting in at least half of the radiation energy being lost in such a device. While such a disadvantage might be addressed by placing two energy capture systems (scintillator and photodiode) on either side of the radioactive layer, it would add complexity, cost, and another optical interface at which the low energy photons could be scattered or absorbed. Additionally, in a radioactive foil or other coating, self-absorption limits the radiation that can be put into a single device.

In addition to incorporating radioactive isotopes into scintillator materials, radioactive isotopes can also be incorporated directly into a semiconductor. In such an embodiment, a radioactive isotope is incorporated into the semiconductor material as a constituent element, a dopant, and/or an impurity. Thus, the semiconductor junction may function both as a emitter and as the associated energy conversion device.

Possible applications for the currently disclosed power sources include, but are not limited to, implantable medical devices, power supplies for remote long term monitoring and possible "trickle chargers" for consumer applications. Another particularly compelling application for such a power source is for prolonged space missions to replace radiothermal generators. Without wishing to be bound by theory, such a power source scaled up to the size necessary for a space mission would be approximately 2 to 3 times the efficiency of current radiothermal generators.

Turning now to the figures, specific embodiments of the disclosed nuclear batteries will be described.

FIG. 1 shows a schematic drawing of a scintillator 100 coupled to an energy conversion device 140. Scintillator 100 contains radioactive sources 110 which emit radiation 120. In one embodiment, the radiation comprises beta particles. However, it should be understood that the particular radioactive material used in the scintillator 100 may comprise any appropriate radioactive element(s) that may emit any combination of alpha, beta, gamma, neutron, and/or positron radiation as the current disclosure is not limited to any particular material or type of radiation. Emitted radiation 120 is subsequently converted to lower energy radiation 130 through interactions with the scintillator material itself. The wavelength of the lower energy radiation is a characteristic of the scintillator. In certain embodiments, the emitted lower energy radiation 130 comprises visible and/or ultraviolet light, and may have wavelengths ranging between approximately 400 nm to 650 nm. However, it should be understood that the current disclosure is not limited to any particular wavelength of light. The intensity of the emitted light is also characteristic of the selected scintillator material. In some embodiments, the scintillator material is selected to provide high-intensity emitted light. For example, the scintillator material can be selected to provide greater than approximately 30,000 photons per MeV, 40,000 photons per MeV, 50,000 photons per MeV, 60,000 photons per MeV, 70,000 photons per MeV, or 80,000 photons per MeV of energy from the absorbed radioactive emissions. Other intensity values are also possible. An energy conversion device 140 is coupled to at least one side of scintillator 100 in any appropriate fashion, including by indirect coupling. Energy conversion device 140 is adapted to convert the lower energy light to electrical power. Depending upon the embodiment, conversion device 140 may be a photodiode, photoconductor, a solar cell, or any other appropriate device capable of transforming the incident light into electrical energy. The scintillator may be shaped in any convenient manner such that it may be coupled to the energy conversion device. Further, the shape of the scintillator may be chosen to optimize the power output of the device, to facilitate the fabrication of the scintillator, or to accommodate any other appropriate design considerations. In some embodiments, additional energy conversion devices may be coupled to the other surfaces of the scintillator to increase the efficiency of the energy capture the system.

Without wishing to be bound by theory, lower energy radiation 130 is emitted isotropically within the scintillator and is eventually incident on one of the outer surfaces of scintillator 100. In order to facilitate absorption in conversion of the lower energy radiation 130 by the energy conversion device 140, it is desirable that the interface(s) 150 located between the scintillator 100 and energy conversion device(s) 140 be substantially transparent to the incident low-energy radiation 130. Interface 150 may be embodied in any number of different ways including, but not limited to, an optical coupling device, direct contact, intermediate transparent materials, or any other appropriate method for optically coupling scintillator 100 to energy conversion device 140. In embodiments not incorporating additional energy conversion devices on the other sides of scintillator 100, the device may include reflective layers 160 on one or more of the exterior surfaces of scintillator 100. The materials of reflective layers 160 are selected to internally reflect incident lower energy radiation 130. Without wishing to be bound by theory, the inclusion of reflective layers 160 results in multiple internal reflections and diffuse scatterings of the incident radiation at the surfaces of the scintillator which eventually results in the low energy radiation 130 being incident upon interface 150 and being absorbed by the energy conversion device 140. Therefore, the overall efficiency of the power source may be increased due to this capture of energy radiated in directions other than towards the energy conversion device which is in contrast to traditional nuclear batteries.

In some embodiments, the scintillator may be fabricated with layers 170 which comprise a scintillator material that is substantially free of the radioactive material. Layers 170 may be sized and arranged to enable a nuclear battery to substantially absorb all of the emitted radiation and convert it to lower energy photons before it can either escape into the environment or be transmitted directly into the energy conversion device 140. By absorbing and converting the unconverted radiation emitted by the scintillator 100 the efficiency of the device may be increased and the need for additional radiation shielding may be reduced. Layers 170 may be embodied in any number of ways including composition gradients within the scintillator 100 as well as separate layers of material that are assembled with the scintillator material 100. For example, in one embodiment, the concentration of a radioactive isotope within scintillator 100 increases towards an interior portion of scintillator 100. In some instances, an exterior portion of scintillator 100 is substantially free of the radioactive material. This exterior portion may include the entire exterior surface of scintillator 100, or it may correspond to only a portion of the exterior surface of scintillator 100. For example, an exterior portion of scintillator 100 that is essentially free of the radioactive material may correspond to interface 150 located between scintillator 100 and energy conversion device 140. In another embodiment, one or more layers of scintillator material substantially free of the radioactive material are coupled to the exterior surfaces of scintillator 100. This may include one or more layers disposed between scintillator 100 and energy conversion device 140. The one or more layers of scintillator material may comprise the same basic scintillator material as scintillator 100, or they may comprise a separate scintillator material as the current disclosure is not limited in this fashion. Further, the one or more layers are coupled to scintillator 100 in any appropriate fashion including direct and indirect coupling methods.

Figure 2:
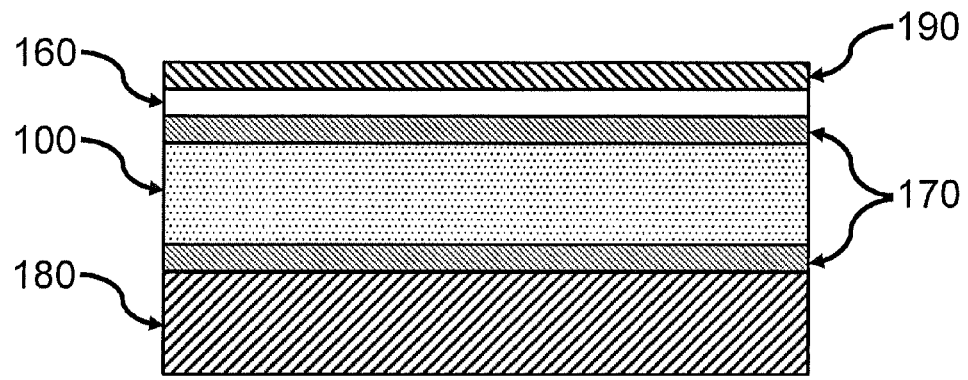
FIG. 2 is a schematic representation of a scintillator incorporating a radioactive isotope deposited onto a substrate.

Another embodiment of a scintillator 100 incorporating a radioactive isotope is depicted in FIG. 2. The depicted embodiment corresponds to a substantially two-dimensional device such as might be expected for a device constructed using various types of deposition methods as described in more detail below. Scintillator 100 is disposed on a substrate 180 which may correspond to any number of different structures. For example, substrate 180 may include: an optically transparent material such as sapphire or quartz; a photodiode; a photoconductor; single crystal or polycrystalline scintillator material substantially free of the radioactive material; or any other appropriate substrate. Similar to the above, layers 170 comprising a scintillator material substantially free of the radioactive material may also be incorporated into the device. As depicted in the figure, layers 170 are be disposed on both sides of the layer corresponding to scintillator 100, including between scintillator 100 and substrate 180. It should be understood that the device may include one, both, or neither of depicted layers 170 as the current disclosure is not limited in this manner. The device may also include an optional reflective layer 160 constructed and arranged to internally reflect the light. Depending upon the particular embodiment, the internally reflected light is either transmitted through substrate 180 to an associated energy conversion device or it is absorbed by an energy conversion device corresponding to substrate 180. In some embodiments, the device also includes a mechanical and/or chemically protective layer 190 to protect the scintillator material from the surrounding environment. While specific types and arrangements of the layers are depicted in FIG. 2, other layers and other arrangements of the layers are also possible.

The inventors have recognized that unlike phosphors, scintillators are typically transparent to their own emission, and therefore a system incorporating such a material may be scaled in the vertical (out of plane direction) to larger sizes without adversely affecting the efficiency of the system. The first significant implication of such a design is that scintillators incorporating radioactive isotopes may be made thick enough to capture substantially all of the radiation emitted from the incorporated radioactive isotopes. For example, a scintillator may be made thick enough to substantially completely stop higher energy beta particles, such as the 1.1 MeV (average) beta emissions from the Sr-90/Y-90 decay, including any Brehmsstrahlung radiation or other secondary emissions. Without wishing to be bound by theory, such an arrangement increases the attainable energy density in the battery. Further, a scintillator based system can be easily scaled up in volume to provide more energy allowing the light output of a large scintillator to be coupled to a photodiode with small area, which increases the flux incident on the junction. Since the efficiency of many photodiodes is greater for higher incident light flux, such an arrangement may further increase the efficiency of the system.

Without wishing to be bound by theory, in the above described nuclear batteries incorporating radioactive isotopes in a scintillator, some efficiency might be lost due to the two stage conversion process (i.e. conversion of the high energy particle to a low energy photon) as compared with the direct conversion of the high energy particle to electron-hole pairs in a semiconductor junction. However, this loss of efficiency may be at least partially offset by more effective absorption of the high energy particles throughout the larger volume of the scintillator material as compared to the limited effective volume capable of absorbing high energy particles in a semiconductor junction. For example, and without wishing to be bound by theory, in a p-n junction device, much of the radiation is absorbed away from the junction and the electron-hole pairs might not be effectively collected. Furthermore, semiconductor devices, including photodiodes, are very sensitive to defects in the crystal structure and are therefore prone to damage from high energy radiation. In contrast, while the crystal structure of scintillators are also subject to radiation damage, their performance is far more tolerant of defects than semiconductor junctions and in some instances radiation damage in a scintillator is self-healing, for example through annealing processes. In view of the limitations and geometric constraints associated with devices that operate using direct capture, scintillator materials incorporating radioactive isotopes can be constructed exhibiting greater efficiencies.

The scintillator material incorporating a radioactive material may be embodied using any number of materials. For example, the scintillator material may include a radioactive isotope of a constituent element, a dopant, and/or an impurity of the scintillator material. While any of the above embodiments, or combinations of those embodiments, can be used, it may be particularly advantageous to incorporate a radioactive isotope of one of the constituent elements of the scintillator. Without wishing to be bound by theory, such an embodiment is advantageous because there are no chemical differences between the radioactive and stable constituent element. Therefore, the radioactive isotope can be uniformly distributed throughout the scintillator crystal without affecting the crystal structure or adversely impacting its performance as a scintillator. One specific example is strontium-90 incorporated in strontium iodide. However, since scintillators are tolerant of, frequently benefit from, or even need dopants/impurities to function, the scintillators can also include radioactive dopants and impurities. In one such embodiment, thallium-204 is incorporated into thallium doped cesium iodide.

Without wishing to be bound by theory, the strontium-90/strontium iodide system noted above may be particularly advantageous. Strontium iodide is a very bright scintillating material, brighter than almost all other known scintillator crystals. Further, strontium-90 decays into yttrium-90 which is a short-lived high energy pure beta emitter. Therefore, strontium-90 may be viewed as an excellent beta emitter for use with scintillator materials because of its 30 year half-life and the emission of two energetic beta particles without accompanying gamma or alpha emissions. The incorporation of strontium-90 into the crystal lattice of strontium iodide allows for the possibility of a self-emitting source with extremely high power density.

The scintillators described herein may be formed using any number of techniques including, but not limited to: growth of large, transparent single crystals; ceramic processing; screen-printing, doctor blading; and deposition methods including, but not limited to, vapor phase deposition.

In addition to incorporating a radioactive material into a scintillator, in some embodiments, a radioactive material is incorporated into a phosphor coupled to an energy conversion device. Similar to the above disclosed scintillator materials, a phosphor incorporating a radioactive material may also act as both a radioactive source and a light emitter to provide indirect conversion of the radiation prior to converting the light into electrical power.

Figure 3:
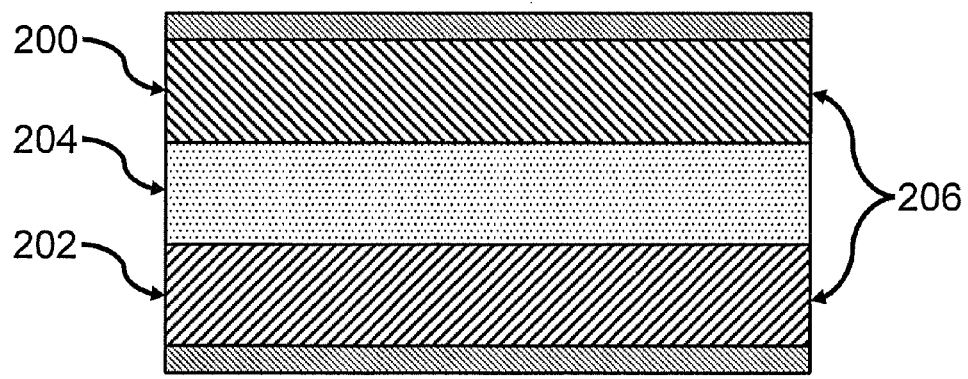
FIG. 3 is a schematic representation of a semiconductor device incorporating a radioactive isotope.

An approach similar to that described above with regards to scintillators may also be used to directly couple radioactive materials to semiconductor diodes. For example, in one embodiment, a radioactive isotope is introduced during the formation of a semiconductor junction either as an impurity, an elemental substitute for the semiconductor material, or a dopant. For example, radioactive thallium-204 may be added to thallium bromide during the manufacturing process. A schematic embodiment of a semiconductor diode incorporating a radioactive material is depicted in FIG. 3. In the depicted embodiment, a semiconductor diode includes a p-type semiconductor 200 and an n-type semiconductor 202. The semiconductor diode also includes depletion region 204 located between the p-type and n-type semiconductors.

Depending upon the particular embodiment, a radioactive material is incorporated into any of the p-type semiconductor 200, n-type semiconductor 202, and/or depletion region 204. Without wishing to be bound by theory, to maximize the amount of radiation absorbed within the depletion region, it is desirable that substantially all of the radioactive material is either located within an absorption length of depletion region 204, or located within depletion region 204 itself. In one embodiment, losses due to unabsorbed radiation are minimized by locating the radioactive material on the side of the depletion region further from an external surface of the semiconductor diode. For example, a thin layer of semiconductor material incorporating a radioactive material might be located within a bulk portion of semiconductor material that is substantially free from the radioactive material and located on the side of the depletion region further from the external surface of the semiconductor diode.

In some embodiments, a beta particle emitting radioactive material is used. Depending upon the energy of the emitted beta particles, absorption lengths of the beta particles within the semiconductor material may be less than approximately 1 mm, 0.9 mm, 0.8 mm, 0.7 mm, 0.6 mm, 0.5 mm, 0.4 mm, 0.3 mm, 0.2 mm, 0.1 mm. Other absorption lengths are also possible depending on the type of radiation being absorbed and the energy of that radiation.

In some embodiments, the semiconductor diode includes layers 206 that are substantially free of the radioactive isotope. Similar to the embodiments described with regards to the currently disclosed scintillators, layers 206 may be integrally formed with depletion region 204 such that the concentration of radioactive isotope within the semiconductor material decreases towards an exterior portion of the semiconductor device. Alternatively, layers 206 may comprise a separate semiconductor layer that is substantially free of the radioactive isotope and arranged on the exterior portions of the semiconductor device. In some embodiments, layers 206 have a thickness sufficient to absorb substantially all of the radiation emitted from the radioactive material incident thereon which may enable a reduced amount of shielding to be used. While two layers have been depicted in a particular arrangement, it should be understood that other arrangements are possible including, but not limited to, a single layer located on an external face of a semiconductor as well as layers located along the sides of a semiconductor device. The semiconductor diode can also incorporate mechanical and/or chemically protective coatings as well, not depicted.

Multiple fabrication methods for high quality scintillators, including alkali halide scintillators, and specifically doped strontium iodide scintillators, have been developed. These methods have been generally based on fabrication processes using anhydrous precursors. However, in addition to the necessary modifications to incorporate a radioactive isotope into the material, in some cases, the form in which the radioisotope of a specific element is available may not be chemically compatible with established scintillator fabrication processes. In other instances, it may be desirable to modify a scintillator fabrication process to reduce the risk of radioactive contamination of equipment and/or the environment, or to reduce the quantity of contaminated waste generated by the process. For example, it may be desirable to develop processes which minimize the transfer of material from one container to another, both to avoid the risk of contamination of the environment during the transfer and to reduce the number of contaminated vessels that must be disposed of after the process. While two possible fabrication methods are described below, it should be understood that any number of modifications and different fabrication methods could be employed to form the currently disclosed materials and the current disclosure is not limited to any particular formation method.

As noted above, commercial fabrication of alkali halide scintillators generally starts with anhydrous precursors. The processes are also generally optimized for keeping the material completely dry and oxygen free. However, current production of scintillators incorporating radioactive isotopes are limited to the commercially available forms of the radioisotope. For example strontium-90 is commercially available in two forms: a ceramic of unknown composition and as an aqueous solution of $^{90}SrCl_2$, presumably made by dissolving the radioactive metal in HCl. Presumably, for a sufficient quantity and extra cost, $^{90}SrI_2$ in HI could be made similarly by dissolving the metal in HI. However, for sufficiently small concentrations, the chloride present in the aqueous solution of $^{90}SrCl_2$ is compatible with the chemistry of the $SrI_2$ scintillator and so standard commercial solutions may be used.

The aqueous solution is clearly incompatible with the currently employed commercial processes for fabricating the scintillator, which, as mentioned above, presumes anhydrous precursors. Furthermore, for small to moderate batches of radioactive isotope, the quantities of radioactive halide are very small and are therefore a challenge to dehydrate separately and mix with the standard precursors. For example, the specific activity of strontium-90 is 140 Ci/g. Therefore, a 1 mW battery would require approximately 1 to 2 Ci of radioisotope, depending on the efficiency. This corresponds to approximately 7 mg of strontium-90 or approximately 30 mg of $^{90}SrI_2$. A scintillator that can be practically coupled to a solar cell would need to be considerably larger, approximately 1 to 5 g. Not only is it difficult to dehydrate and purify very small amounts of the halide (even a batch of 100 batteries would only be about 3 g), but then dispersing it uniformly within the standard material would also pose a challenge.

In one embodiment, the above noted limitations are overcome using a solution-based fabrication process to form the scintillator materials incorporating a radioactive material. In general the process involves: (1) preparing a mixture of a dissolved radioactive material and dissolved scintillator material composition; (2) drying the solution to form a solid; and (3) recrystallizing the solid to form the desired scintillator material containing a radioactive material. In some embodiments, the above steps can be performed in the same ampoule minimizing the risk of radiation exposure or spill.

Turning now to a more detailed description as illustrated in FIG. 4, the embodiment includes providing a solution containing a dissolved scintillator material composition and a dissolved radioactive material, 300. In some embodiments, the scintillator material composition and the radioactive material are dissolved in an aqueous solution. In other embodiments, the scintillator material composition and the radioactive material are dissolved in a non-aqueous solution. In either case, the liquid in which the materials are dissolved help to disperse the radioisotope in the non-radioactive precursors. The ratio of the radioactive material to non-radioactive material is determined by the total desired activity after the crystals are grown. The solution may be provided with the dissolved materials already mixed in a desired ratio, or the individual materials may be dissolved in separate solutions and subsequently mixed in the appropriate ratio. The amount of liquid required for dissolving the non-radioactive scintillator material composition may be adjusted depending on the amount of solution to be added, and may also be determined by the need to disperse the radioactive isotope uniformly within the final crystal. In certain conditions it may not be necessary to add any liquid to the standard scintillator material composition, for example if the amount of solution to be added is sufficient to uniformly disperse the isotope or if further steps in the process contribute to the uniformity of the distribution. If necessary, the solution is mixed to further ensure homogeneous dispersion of the materials, 302.

After obtaining a substantially homogeneous dispersion of the dissolved materials within the solution, liquid is removed from the solution using appropriate dehydration and/or desolvation techniques to form a solid that is substantially free from liquid, 304. The applied dehydration and/or desolvation techniques may include heating the solution under vacuum to boil off the liquid. Once there is no liquid present (this may be determined either visually or by monitoring the temperature of the materials), the material is heated in several steps under flowing inert gas, for example argon or dry nitrogen. The temperature profile includes soaks just above the decomposition temperatures of the various hydrates, see 306. The temperature profiles associated with decomposing the various hydrates can be designed based on information found in the literature or through careful monitoring of process parameters. These various processing parameters can also be monitored to monitor the decomposition of the hydrates within the material. Appropriate processing parameters for monitoring hydrate decomposition include, but are not limited to any combination of process temperature, moisture content of the flowing gas, and/or crystal structure of the material, monitored, for example, by in-situ x-ray diffraction.

Once the materials are determined to be dry and the hydrates have been decomposed, the temperature is increased to melt the material, 308. Once the material is completely molten, the temperature is reduced very gradually in order to promote the growth of large crystallites, 310. Without wishing to be bound by theory, melting of the material may contribute further to the mixing of the radioactive material with the scintillator material composition. Further, the temperature is greater than the melting temperature of each of the components including any dopants such as $EuI_2$ However, it may be desirable to avoid accelerated decomposition of the material due to excessively high temperatures. Therefore, the temperature can be selected to be less than a decomposition temperature of the material. For example, the processing temperature of a strontium iodide scintillator may be selected to avoid excessive loss of iodine from decomposition of strontium iodide.

For sufficiently well controlled processes, the above described method may produce a material of adequate quality for use in a nuclear battery application. Alternately, the material may undergo additional processing, 312. This additional processing may include, but is not limited to, purification of the material using known techniques within the art including, for example, vacuum distillation, recrystallization, and zone refinement. In some embodiments, the initial reaction vessel may be designed to accommodate these additional steps, for example, with a series of constrictions which may be sealed off at different stages of the process. Alternately, the material may be removed from the initial reaction vessel and placed in a second ampoule for further processing.

In one specific example, a $SrI_2$ scintillator incorporating a radioactive material can be prepared by preparing a mixture of radioactive and natural $SrI_2$ in solution. This may involve dissolving an appropriate amount of non-radioactive $SrI_2$ in water and mixing it with the appropriate amount of radioactive $SrCl_2$ also in solution. The solution containing dissolved $SrI_2$ and radioactive $SrCl_2$ is then subjected to a drying process to drive off the excess water and form anhydrous $SrI_2$ solid containing radioactive strontium-90 incorporated therein as a constituent element of the scintillator material. The anhydrous $SrI_2$ solid is then subjected to an appropriate recrystallization technique to recrystallize the $SrI_2$ to form a usable scintillator crystal.

Without wishing to be bound by theory, the above disclosed liquid based formation of a scintillator incorporating a radioactive material is suitable for growing moderate to large crystals ranging from a fraction of a gram to several kilograms in weight. A 100 W battery for space exploration applications would require approximately 100 kCi, or a little under 1 kg of radioisotope, or about 3 kg of $^{90}SrI_2$. Other applications require much smaller devices. For example, a 1 mW battery suitable for powering a remote wireless sensor may require 1 Ci of radioisotope, which corresponds, for example, to 1% of the strontium in a 3 g crystal, which would be about ⅔ of a cubic cm. Larger crystals may be subsequently cut to an appropriate size depending on the desired power output. Alternatively, the material may be subjected to additional and/or alternative processing techniques including, but not limited to, screen printing, doctor blading, and ceramic processing methods, as disclosed in co-pending application Ser. No. 13/312,841 filed on Dec. 12, 2011 the entirety of which is incorporated herein by reference, to form the scintillator materials to a desired size and shape.

In another embodiment, a scintillator incorporating a radioactive material such as a radioactive isotope is formed using an appropriate physical vapor deposition technique. Without wishing to be bound by theory, scintillators formed in this fashion may be appropriate for low to moderate power applications. Any suitable vapor phase deposition method may be used including, but not limited to, sputtering, e-beam evaporation, thermal evaporation, hot wall evaporation, or reactive chemical vapor deposition. The concentration of radioisotope may be controlled either by providing separate targets for the radioactive and non-radioactive materials, or by pre-mixing them at the desired ratio prior to making the target. The substrate may be any convenient material that is mechanically, chemically, and optically suitable, for example sapphire, quartz, or commercially grown single crystal substrates of the same or a different scintillator material. Alternately the scintillators may be grown directly on a photodiodes or similar device to enhance adhesion and coupling. In the last case, it may desirable to grow a layer of non-radioactive scintillator directly on the photodiode surface, to protect the photodiode from direct exposure to high energy radiation. subsequently, a layer containing the radioactive scintillator would be deposited over the standard scintillator. The concentration of radioactive isotope in the scintillator may be adjusted to give the desired power density. Finally, it may be desirable to deposit a capping layer(s) on top of the scintillator to protect the material mechanically and chemically and/ or to provide optical reflection to redirect light incident on the exterior surface toward the interface with the photodiode. The deposited scintillators and substrates may be cut to any desired size and/or the deposited scintillators may be incorporated into a stacked assembly to provide a desired energy density.

FIG. 5 depicts one embodiment of the above-noted physical vapor deposition method for forming a scintillator incorporating a radioactive material. In an initial step, an appropriate substrate as noted above is provided at 400. An optional layer comprising a scintillator material that is substantially free of the radioactive material is then deposited onto the substrate, 402. The scintillator material and radioactive material are subsequently co-deposited thereon to form the scintillator incorporating a radioactive material, 404. Another optional layer comprising a scintillator material that is substantially free of the radioactive material is then deposited onto the scintillator material incorporating the radioactive material, 406. Additional optional layers can also be included to improve performance of the nuclear battery. For example, a reflective material, 408, as well as mechanical and/or chemically protective materials, 410, may be subsequently deposited onto the scintillator. While specific layers and arrangements of those layers are noted above, it should be noted that some embodiments may include a subset of those layers, include additional layers not described, and the noted layers may be arranged differently as the current disclosure is not limited in this manner.

Without wishing to be bound by theory, vapor phase deposited scintillators may range in thickness from a few microns to one or more centimeters. If the layers are thinner than several millimeters, it may be desirable to couple the deposited scintillator incorporating a radioactive material to a non-radioactive scintillator(s) to assure the capture of substantially all the emitted radiation, for example by mechanically sandwiching the radioactive scintillator between layers of standard scintillators substantially free of the radioactive material.

The above methods enable easy to implement fabrication of the currently disclosed materials and offer: flexible and easy control with regards to the desired radiation activity; ensure substantially complete and uniform mixing of radioactive and non-radioactive components; and are readily scaled up for increased production amounts. Further, a significant advantage associated with the currently disclosed fabrication processes is that all of the steps can be performed in a single vessel increasing the safety to the operator and minimizing the cost of production.

While several manufacturing methods have been disclosed above, the currently disclosed materials are not limited to these methods of manufacture. Therefore, the currently disclosed materials may be made using any appropriate method of manufacture. For example, one additional way in which the materials might be manufactured is by the traveling heater method of crystal growth using a solution including a molten element, salt, or metal that is compatible with the particular material being processed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device comprising:
    a first scintillator material including a radioactive material, wherein radiation emitted from the radioactive material is converted into light emitted by the first scintillator material, wherein an exterior portion of the first scintillator material is substantially free of the radioactive material; and
    an energy conversion device coupled to the first scintillator material, wherein the energy conversion device converts the light to electrical power.

2. The device of claim 1 further comprising a layer of a second scintillator material substantially free of the radioactive material disposed on a surface of the first scintillator material.

3. The device of claim 2, wherein the layer is located between the first scintillator material and the energy conversion device.

4. The device of claim 2, wherein the layer comprises a thickness sufficient to absorb substantially all of the radiation emitted from the radioactive material incident upon the layer.

5. The device of claim 2 further comprising reflective surfaces constructed and arranged to internally reflect the light emitted from the first scintillator material back into the first scintillator material.

6. A device comprising:
    a first scintillator material including a radioactive material, wherein radiation emitted from the radioactive material is converted into light emitted by the first scintillator material; and
    an energy conversion device coupled to the first scintillator material, wherein the energy conversion device converts the light to electrical power, wherein the energy conversion device is at least one of a solar cell, a photodiode, or a photoconductor.

7. The device of claim 6, wherein the exterior portion of the first scintillator material comprises a thickness sufficient to absorb substantially all of the radiation emitted from the radioactive material incident upon the exterior portion of the first scintillator material.

8. The device of claim 6, wherein the exterior portion of the first scintillator material is located adjacent to the energy conversion device.

9. A method for fabricating a scintillator, the method comprising:
    providing a solution including both a dissolved scintillator material composition and a dissolved radioactive material;
    performing at least one of dehydration and desolvation on the solution to form a material comprising both the scintillator material composition and the radioactive material;
    heating the material to a temperature above a melting point of the scintillator material composition and a melting point of the radioactive material; and
    cooling the material to form a solid scintillator material including the radioactive material.

10. The method of claim 9, wherein the solid scintillator material comprises at least one of strontium iodide and thallium doped cesium iodide.

11. A method for fabricating a scintillator, the method comprising:
    vapor phase depositing a first layer onto a substrate, wherein the first layer comprises a scintillator material including a radioactive material incorporated within the scintillator material.

12. The method of claim 11, wherein the scintillator material comprises at least one of strontium iodide and thallium doped cesium iodide.

* * * * *